United States Patent [19]

Debroy et al.

[11] Patent Number: 5,035,785
[45] Date of Patent: Jul. 30, 1991

[54] NONIONIC SURFACTANT AS A PIGMENT DISPERSANT AND FILM BUILD ADDITIVE

[75] Inventors: Tapan K. Debroy, Utica; Ding Y. Chung, Rochester Hills; Sioe-Heng A. Tjoe, Troy; Craig R. Deschner, Southfield, all of Mich.

[73] Assignee: E. I. Du Pont de Nemours and Company, Wilmington, Del.

[21] Appl. No.: 483,838

[22] Filed: Feb. 23, 1990

[51] Int. Cl.$^5$ .................. C25D 13/10; C08L 63/02; C08K 5/00
[52] U.S. Cl. .................. 204/181.7; 523/415; 524/372
[58] Field of Search .................. 204/181.7; 523/415; 524/372

[56] References Cited

U.S. PATENT DOCUMENTS

| | | | |
|---|---|---|---|
| 4,035,275 | 7/1977 | Sturni et al. | 204/181.7 |
| 4,081,343 | 3/1978 | Schimmel et al. | 204/181.7 |
| 4,410,657 | 10/1983 | Loch | 204/181.7 |
| 4,525,260 | 6/1985 | Abbey et al. | 204/181.7 |
| 4,554,212 | 11/1985 | Diefenbach et al. | 204/181.7 |
| 4,564,632 | 1/1986 | Nonme et al. | 514/522 |
| 4,612,338 | 9/1986 | Chung et al. | 204/181.7 |
| 4,683,285 | 7/1987 | Paar et al. | 204/181.7 |
| 4,715,898 | 12/1987 | Johnson | 204/181.7 |
| 4,788,260 | 11/1988 | Batzill et al. | 525/423 |
| 4,810,738 | 3/1989 | Caridi | 524/317 |
| 4,826,907 | 5/1989 | Murao et al. | 524/394 |
| 4,883,352 | 11/1989 | Rao et al. | 204/181.7 |

FOREIGN PATENT DOCUMENTS

| | | |
|---|---|---|
| 52066780 | 6/1977 | Japan. |
| 55-132783 | 10/1980 | Japan. |
| 58-156077 | 9/1983 | Japan. |
| 60-195162 | 10/1985 | Japan. |
| 61-118403 | 6/1986 | Japan. |
| 61-134335 | 6/1986 | Japan. |
| 61-274735 | 12/1986 | Japan. |

Primary Examiner—John F. Niebling
Assistant Examiner—Kishor Mayekar
Attorney, Agent, or Firm—Hilmar L. Fricke

[57] ABSTRACT

Disclosed herein are electrodepositable cationic baths containing nonionic pigment dispersants. These nonionic pigment dispersants are ethoxylated styrenated phenols which allow for increased production capacity and lower VOC. The ethoxylated styrenated phenols are also used as an additive which can increase film build and improve film smoothness.

6 Claims, No Drawings

NONIONIC SURFACTANT AS A PIGMENT DISPERSANT AND FILM BUILD ADDITIVE

TECHNICAL FIELD

The field of art to which this invention pertains is electrodepositable cationic baths containining nonionic pigment dispersants. These nonionic pigment dispersants are ethoxylated styrenated phenols Ethoxylated (or alkoxylated) styrenated phenols are also used as an additive which can increase film build and improve film smoothness.

BACKGROUND

The coating of electrically conductive substrates by electrodeposition is a well known and important industrial process. (For instance, electrodeposition is widely used in the automotive industry to apply primers to automotive substrates). In this process, a conductive article is immersed as one electrode in a coating composition made from an aqueous emulsion of film-forming polymer. An electric current is passed between the article and a counter-electrode in electrical contact with the aqueous emulsion, until a desired coating is produced on the article. The article to be coated is the cathode in the electrical circuit with the counter-electrode being the anode.

Resin compositions used in cathodic electrodeposition baths are also well known in the art. These resins are typically manufactured from polyepoxide resins which have been chain extended and adducted to include a nitrogen. The nitrogen is typically introduced through reaction with an amine compound. Typically these resins are blended with a crosslinking agent and then neutralized with an acid.

The principal emulsion is combined with a pigment paste, coalescent solvents, water, and other additives (usually at the coating site) to form the electrodeposition bath. The electrodeposition bath is placed in an insulated tank containing the anode. The article to be coated is made the cathode and is passed through the tank containing the electrodeposition bath. The thickness of the coating is a function of the bath characteristics, the electrical operating characteristics, the immersion time, and so forth.

The coated object is removed from the bath after a set amount of time. The object is rinsed with deionized water and the coating is cured typically in an oven at sufficient temperature to produce crosslinking. It is then typically covered with any of a variety of different topcoat systems (e.g. basecoat/clearcoat).

The prior art of cathodic electrodepositable resin compositions, coating baths, and cathodic electrodeposition processes are disclosed in U.S. Pat. Nos. 3,922,253; 4,419,467; 4,137,140; and 4,468,307.

The pigment dispersant is a very important part of an electrocoat primer composition. The dispersion process involves the separation of the primary pigment particles from their agglomerates or aggregates, the displacement of occluded air and absorbed water, and the wetting and coating of the pigment surfaces with the dispersion resin. Ideally, each primary particle, having been mechanically separated during dispersion, is also stabilized against flocculation. If the pigment particles are not properly dispersed and stabilized in the paint, the advantages built into the pigment by the manufacturer may be lost. For instance, the pigment may settle in the electrodeposition bath which can result in loss of corrosion protection of the substrate.

In addition, surface appearance, operating characteristics and so forth may be adversely impacted by inadequate pigment dispersion.

An improved pigment dispersant can result in increased production capacity, and lower volatile organic content (VOC) in the electrodeposition bath. Current commercial pigment dispersants used in cathodic electrocoat processes typically are polyepoxide resins containing either onium salts or amine salts. Using the pigment dispersants known in the prior art, the typical pigment to binder ratio that can be obtained is about 3:1. These pigment dispersants also require the use of solvents which raise the VOC of the electrocoat bath. Current commercial pigment dispersants contain at least 30 to 40% solvent. Furthermore, pigment dispersants of the prior art are not known to increase film build.

What is needed is a pigment dispersant which will allow improved processability, a lower VOC in the electrocoat bath, and increase the film build.

Another important part of electrocoat compositions are additives. Numerous different types of additives can be added. For instance, additives are sometimes used to increase film build. High film build is important to maintain equivalent corrosion resistance without the use of a primer surfacer over the electrocoat. Flow additives are also used to improve film smoothness.

What is needed is an additive which will both increase film build and give a film with excellent smoothness.

SUMMARY OF THE INVENTION

It has been discovered that by using an ethoxylated styrenated phenol as a pigment dispersant that pigment to binder ratios can be increased to 3.5:1 or more. In addition, ethoxylated styrenated phenol pigment dispersants allow minimization or elimination of the use of solvent in the pigment dispersant and helps improve film build.

The use of ethoxylated styrenated phenols as pigment dispersants has been disclosed in the art. For example U.S. Pat. No. 4,826,907 at column 11, lines 15-27 discloses the use of ethoxylated styrenated phenols as pigment dispersants in an acrylic or methacrylic resin emulsion coating composition. However, until now it has not been known to use ethoxylated styrenated phenols as a pigment dispersant in cathodic electrocoat. Furthermore, we are not aware of any use of other nonionic polymers being used as pigment dispersants in electrocoat. (Other nonionic polymers or nonionic surfactants do not have the pigment dispersing capability that provides a stable pigment paste). As discussed above, current commercial electrocoat compositions typically use polyepoxide resins containing either onium salts or amine salts. One other reason that nonionic polymers or nonionic surfactants have not been used in the past as pigment dispersants is because they have no electrical charge and therefore are not thought to be depositable on the cathode.

The ethoxylated styrenated phenol pigment dispersants of our invention also have the following additional properties: (1) they are water soluble; (2) they have a low viscosity; and (3) they have excellent mechanical stability. Importantly and surprisingly, the ethoxylated styrenated phenol pigment dispersants also have been found to increase film build, improve the film appearance and maintain the film appearance for long periods of time.

It has also been found that ethoxylated styrenated phenols can be used not only as a pigment dispersant, but also as an additive. When used as an additive, ethoxylated styrenated phenols and propoxylated styrenated phenols (and possibly other alkylated styrenated phenols such as butylated styrenated phenols, and so forth) have been found to increase film build and give an exceptionally smooth film for long periods of time. When alkylated styrenated phenols are used as an additive they are typically added before emulsification or to the emulsion. (This can be used in conjunction with other pigment dispersants known in the art). Surprisingly, alkylated styrenated phenols have also been found to minimize or eliminate discoloration of the electrocoat on overbake. During "overbake" (30° F. or more over normal bake temperatures) current commercial electrocoat systems have a tendency to darken to a yellowish or greenish color. The benefits that are seen when using alkylated styrenated phenols as an additive can also be realized when using ethoxylated styrenated phenols as a pigment dispersant.

DETAILED DESCRIPTION OF THE INVENTION

Our invention relates to the use of ethoxylated styrenated phenols as a pigment dispersant and/or additive for cathodic electrocoat.

As previously mentioned, it is well known that most principal emulsions in cathodic electrodeposition baths have a binder resin which is an epoxy amine adduct blended with a cross-linking agent and neutralized with an acid in order to get a water soluble product. The ethoxylated styrenated phenol pigment dispersants are potentially usable with a variety of different cathodic electrocoat binder resins, but the preferred binder resin is the typical epoxy amine adduct of the prior art. These resins are disclosed in U.S. Pat. No. 4,419,467 which is incorporated herein by reference.

Likewise the preferred crosslinkers for the above-mentioned binder resins are also well known in the prior art. They are aliphatic and aromatic isocyanates such as hexamethylene diisocyanate, toluene diisocyanate, methylene diphenyl diisocyanate and so forth. These isocyanates are pre-reacted with a blocking agent such as oximes, alcohols and caprolactams which block the isocyanate functionality (i.e. the crosslinking functionality). Upon heating, the oximes, alcohols, or caprolactam deblock generating free isocyanate which in turn reacts with the hydroxy functionality of the backbone resin and the alkoxylated styrenated phenols (when used as either a pigment dispersant or film build additive) to give crosslinking. These crosslinking agents are also disclosed in U.S. Pat. No. 4,419,467. The neutralization of the epoxy-amine resin with an acid to attain its cationic character is likewise well known in the art. The resulting binder (or back-bone) resin is combined with pigment paste, deionized water and additives (e.g. flexibilizing agents, film build additives, flow additives and so forth) to form the electrocoat paint bath.

The cationic resin and the blocked isocyanate are the principal resinous ingredients in the principal emulsion and are usually present in amounts of about 30 to 50 percent by weight of solids.

Besides the resinous ingredients described above, the electrocoating compositions of the invention contain a pigment which is incorporated into the composition in the form of a paste. The pigment paste is prepared by grinding pigments into the ethoxylated styrenated phenol pigment dispersant along with optional additives such as wetting agents, surfactants, and defoamers. After grinding, the particle size of the pigment should be as small as practical, generally, a Hegman grinding gauge of about 6 to 8 is usually employed.

Pigments which can be employed in the practice of our invention include titanium dioxide, basic lead silicate, strontium chromate, carbon black, iron oxide, clay and so forth. These are the pigments typically used in automotive primers.

Alkoxylated styrenated phenols are made as disclosed in U.S. Pat. No. 4,564,632 which is incorporated herein by reference. A styrene is reacted with a phenol and the product is then alkoxylated.

The styrene is preferably optionally alkylated styrene and in particularly a compound of the formula

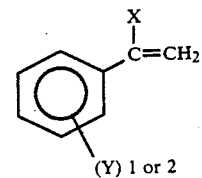

in which
X represents hydrogen or methyl and
Y represents hydrogen or $C_1$–$C_4$-alkyl.

Examples which may be mentioned are styrene, vinyltoluene and α-methylstyrene.

Preferred phenols have the formula

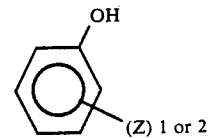

wherein
Z represents hydrogen, $C_1$–$C_4$-alkyl or phenyl. Of these phenols, phenol and the isomeric cresols, xylenols and hydroxydiphenyls are particularly suitable.

Preferred naphthols are, in addition to α-and β-naphthol, homologues of these naphthols with 1 or 2 methyl groups.

The addition products are prepared in a known manner, advantageously in the presence of catalysts, such as sulphuric acid, p-toluenesulphonic acid or zinc chloride. The addition products can be subjected to alkoxylation in the form of single substances, but it is also possible to use mixtures such as are in general initially obtained in the preparation of these products.

The ethoxylated styrenated phenols are known. They can be prepared in a manner which is known per se, for example by the method in German Auslegeschrift No. 1,121,814.

The ethoxylated styrenated phenol products are those which are obtained by reacting addition products of 1 to 3 moles of styrene and 1 mole of phenol with 8–50 moles of ethylene oxide. Preferred ethoxylated styrenated phenols have the following formula:

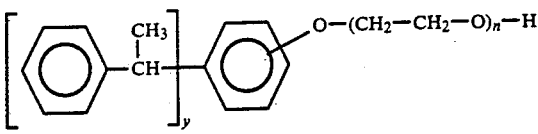

wherein
n denotes a number from 8-30, and
y denotes an average of 2-3.

Our preferred ethoxylated styrenated phenol is available commercially from Milliken Chemical Company under the trade name Synfac 8834 ®.

As discussed above, when used as a pigment dispersant it is imperative that the alkoxylated styrenated phenol be an ethoxylated styrenated phenol However when it is used as a film build additive (i.e. when the compound is added to the electrocoat bath but it is not brought in as the pigment dispersant) it is also possible that other alkylated styrenated phenols (e.g. propoxylated styrenated phenols) could also be used. Our preferred alkoxylated styrenated phenol film build additive is ethoxylated styrenated phenol. Another preferred alkoxylated styrenated phenol film build additive is propoxylated styrenated phenol.

The pigment to binder ratio in the pigment paste is about 1:1 to 5:1, preferably 2.5:1 to 5:1, and most preferably 3.5:1 to 5:1.

The pigment-to-resin weight ratio in the electrocoat paint bath is very important and should be preferably less than 50:100, more preferably less than 40:100, and usually about 20 to 30:100. Higher pigment-to-resin solids weight ratios have also been found to adversely affect coalescence and flow.

The coating compositions of the invention can contain optional ingredients such as wetting agents, surfactants, defoamers and so forth. Examples of surfactants and wetting agents include alkyl imidazolines such as those available from Ciba-Geigy Industrial Chemicals as Amine C ®, acetylenic alcohols available from Air Products and Chemicals as Surfynol 104 A ®. These optional ingredients, when present, constitute from about 0.1 to 20 percent by weight of resin solids.

Film build additives and flow additives are optional ingredients because they increase film build and promote flow. Examples of currently used film build additives and flow additives are ethylene or propylene oxide adducts of nonyl phenols or bisphenol A. In some current commercial electrocoat systems film build additives are usually used at levels of about 0.1 to 15 percent by weight resin solids.

As discussed above, it has been found that alkoxylated styrenated phenols can be used as both a film build additive and flow additive (in addition to or seperate from the use of ethoxylated styrenated phenol as a pigment dispersant). When alkoxylated styrenated phenols are used as an additive it is usually added either before emulsification or directly to the emulsion.

Surprisingly, the alkoxylated styrenated phenols have been found to maintain film appearance and film thickness for long periods of time. An additional benefit of using the alkoxylated styrenated phenols as an additive is its tendency to reduce or eliminate discoloration of the electrocoat during overbake. During "overbake" (the metal substrate is 30° F. or more over normal bake temperatures for 10 minutes) current commercial electrocoat systems have a tendency to darken to a yellowish or greenish color.

When using alkoxylated styrenated phenols as an additive they can be added at levels from 0.1 to 15%, preferably 2-10%, and most preferably 3-7% by weight on total resin solids in the electrocoat bath.

Curing catalysts such as tin catalysts are usually present in the composition. Examples are dibutyltin dilaurate and dibutyltin oxide. When used, they are typically present in amounts of about 0.05 to 2 percent by weight tin based on weight of total resin solids in the electrocoat bath.

The principal emulsions of the electrodepositable coating compositions of the present invention are in an aqueous medium. The average particle size diameter of the resinous phase is about 0.1 to 10 microns, preferably less than 5 microns. The concentration of the resinous products in the aqueous medium is, in general, not critical, but ordinarily the major portion of the aqueous dispersion is water. The aqueous dispersion usually contains from about 3 to 50 percent preferably 5 to 40 percent by weight resin solids. Aqueous resin concentrates which are to be further diluted with water, generally range from 10 to 30 percent by total weight solids.

Besides water, the aqueous medium may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene glycol. The amount of coalescing solvent is not unduly critical and is generally between about 0 to 15 percent by weight, preferably about 0.5 to 5 percent by weight based on total weight of the resin solids.

EXAMPLES

EXAMPLE A

Backbone Resin

The following ingredients were charged into a suitable reaction vessel: 1394.8 parts Epon 828 ® (epoxy from Shell Chemical Company having an epoxy equivalent weight of 188); 527.2 parts Bisphenol A; 395.6 parts Tone 200 ® (from Union Carbide, hydroxy equivalent weight of 263.6); and 101.2 parts xylene. The charge is heated to 145° C. under a nitrogen blanket. 2.4 parts dimethyl benzyl amine was added and the mixture held at 160° C. for one hour. An additional 5.2 parts dimethyl benzyl amine was added and the mixture held at 147° C. until a 1170 epoxy equivalent weight was obtained. The mixture was cooled to 98° C. and 153.2 parts diketimine (reaction product of diethylene triamine and methyl isobutyl ketone; at 72.7% non-volatile) and 118.2 parts methylethanol amine were added. The mixture was held at 120° C. for one hour, then 698.5 parts methyl isobutyl ketone was added. The resin had a final non-volatile of 75%.

EXAMPLE B

CROSSLINKER

A blocked polyisocyanate was prepared by charging 522.0 parts Mondur TD 80 ® (from Mobay Chemical Company) into a suitable reaction vessel. 0.15 parts dibutyltin dilaurate and 385.2 parts anhydrous methyl isobutyl ketone were added under a nitrogen blanket. 390.0 parts 2-ethyl hexanol was added to the mixture while keeping the reaction flask below 60° C. 133.8 parts trimethylolpropane was added. The mixture was held at 120° C. for one hour until essentially all free isocyanate was consumed. Then 63.0 parts butanol was added. The mixture had a 70.0% non-volatile.

EXAMPLE C

CROSSLINKER

A blocked polyisocyanate was prepared by charging 1580.5 parts Mondur TD 80 ® (from Mobay Chemical Company) into a suitable reaction vessel. 500.0 parts anhydrous methyl isobutyl ketone (MIBK), 183.1 parts methanol, and 490.7 parts hexylcellosolve ® were charged to the reaction vessel under a nitrogen blanket. The temperature of the mixture was held under 46° C. 1.5 parts dibutyltin dilaurate was added along with 405.7 parts trimethylolpropane. The mixture was held at about 100° C. for one hour until essentially all isocyanate was consumed. 640.0 parts methyl isobutyl ketone was added. The mixture had a non-volatile of 70.0%.

EXAMPLE D

Pigment Paste

|  | Weight |
|---|---|
| Synfac 8334 ® (from Milliken Chemical Co.) | 222.0 |
| Butylcellosolve ® | 16.0 |
| Lactic Acid (88% in Aqueous Solution) | 4.0 |
| Byk 020 ® (from Byk Chemie) | 2.0 |
| Deionized Water | 699.0 |
| Titanium Dioxide | 526.5 |
| Aluminum Silicate | 109.0 |
| Carbon Black | 27.3 |
| Dibutyltin Oxide | 63.2 |
| Lead silicate | 44.0 |
| Deionized Water | 269.0 |
| Total | 1982.0 |

This example shows the use of ethoxylated styrenated phenol (i.e. Synfac 8334 ®) as a pigment dispersant. The Synfac 8334 ®, butyl cellosolve ®, lactic acid, Byk 020 ®, and deionized water were combined and mixed until homogenous, while mixing, the titanium dioxide, aluminum silicate, carbon black, dibutyltin oxide, lead silicate and deionized water were added. The mixture is dispersed in a sand mill until a Hegman grind gauge reading of seven or greater was obtained

EXAMPLE E

Quarternizing Agent

|  | Weight | Solids |
|---|---|---|
| 2-Ethyl Hexanol Half-Capped TDI in MIBK | 320.0 | 304.0 |
| Dimethyl Ethanolamine | 87.2 | 87.2 |
| Aqueous Lactic Acid Solution | 117.6 | 88.2 |
| 2-Butoxy Ethanol | 39.2 | — |
| Total | 564.0 | 479.4 |

Pigment Grinding Vehile

|  | Weight | Solids |
|---|---|---|
| Epon 829 ® | 710.0 | 682.0 |
| Bisphenol A | 289.6 | 289.6 |
| 2-Ethyl Hexanol Half-Capped TDI in MIBK | 406.0 | 386.1 |
| Quaternizing Agent (from above) | 496.3 | 421.9 |

-continued

|  | Weight | Solids |
|---|---|---|
| Deionized Water | 71.2 | 0 |
| 2-Butoxyethanol | 1095.2 | 0 |
| Total | 3068.3 | 1779.6 |

The quaternizing agent was prepared by adding dimethyl ethanol amine to the 2-ethylhexanol half-capped toluene diisocyanate (TDI) in a suitable reaction vessel at room temperature. The mixture exothermed, and was stirred for one hour at 80° C. Lactic acid was then charged followed by the addition of 2-butoxy ethanol. The reaction mixture was stirred for about one hour at 65° C. to form the desired quaternizing agent.

To form the pigment grinding vehicle, Epon 829 ® (a diglycidyl ether of Bisphenol A from Shell Chemical Company), and Bisphenol A were charged under a nitrogen atmosphere to a suitable reaction vessel and heated to 150° C.–160° C. to initiate the exothermic reaction. The reaction mixture was permitted to exotherm for one hour at 150° C.–160° C. The reaction mixture was then cooled to 120° C., and the 2-ethyl hexanol half-capped toluene diisocyanate was added. The temperature of the reaction mixture was held at 110° C.–120° C. for one hour, followed by the addition of 2-butoxy ethanol. The reaction mixture was then cooled to 85° C., homogenized, and charged with water, followed by the addition of the quaternizing agent prepared above. The temperature of the reaction mixture was held at 80° C.–85° C., until an acid value of one was obtained. The reaction mixture has a solids content of 58%.

EXAMPLE F

Pigment Paste

|  | WEIGHT |
|---|---|
| Dispersion Resin (from Example E) | 266.5 |
| Deionized Water | 445.2 |
| Titanium Dioxide | 280.2 |
| Aluminum Silicate | 54.7 |
| Carbon Black | 24.3 |
| Lead Chromate | 12.0 |
| Lead Silicate | 24.3 |
| Dibutyl Tin Oxide | 17.0 |
| Total | 1124.2 |

The above ingredients were mixed until homogeneous in a suitable mixing container. They were then dispersed in a sand mill until a Hegman reading of seven or greater was obtained. The non-volatile of this material was 50.0%.

EXAMPLE G

Emulsion

|  | Weight | Solids |
|---|---|---|
| Backbone Resin (from Example A) | 553.19 | 414.88 |
| Crosslinker (from Example B) | 319.15 | 223.41 |
| Hexylcellosolve ® | 38.30 | — |
| Surfactant* | 6.38 | — |
| Acetic acid | 11.52 | — |
| Deionized Water | 871.46 | — |

-continued

|  | Weight | Solids |
|---|---|---|
| Total | 1800.00 | 638.29 |

*Surfactant is a mixture of 120 parts Amine C ® from Ciba Geigy, 120 parts acetylenic alcohol, commercially available as Surfynol 104 ® from Air Products and Chemicals, Inc., 120 parts of 2-butoxy ethanol, 221 parts by weight of deionized water, and 19 parts glacial acetic acid.

Thoroughly mix the backbone resin from Example A, crosslinker from Example C, hexylcellosolve ®, acetic acid, and surfactant. Then the deionized water was added under agitation. This mixture was allowed to mix until a majority of the organic ketone had evaporated. The emulsion non-volatile was adjusted to 35.5 % with the necessary amount of deionized water.

EXAMPLE H

Emulsion

|  | Weight | Solids |
|---|---|---|
| Backbone Resin (from Example A) | 553.19 | 414.88 |
| Crosslinker (from Example C) | 319.15 | 223.41 |
| Hexylcellosolve ® | 38.30 | — |
| Surfactant* | 6.38 | — |
| Acetic acid | 11.52 | — |
| Deionized Water | 871.46 | — |
| Total | 1800.00 | 638.29 |

*Surfactant is a mixture of 120 parts Amine C ® from Ciba Geigy, 120 parts acetylenic alcohol, commercially available as Surfynol 104 ® from Air Products and Chemicals, Inc., 120 parts of 2-butoxy ethanol, 221 parts by weight of deionized water, and 19 parts glacial acetic acid.

Thoroughly mix the backbone resin from Example A, crosslinker from Example C, hexylcellosolve ®, acetic acid, and surfactant. Then the deionized water was added under agitation. This mixture was allowed to mix until a majority of the organic ketone had evaporated. The emulsion non-volatile was adjusted to 35.5% with the necessary amount of deionized water.

EXAMPLE 1

Electrocoat Bath

|  | Weight | Solids |
|---|---|---|
| Emulsion (from Example G) | 1580.3 | 561.0 |
| Synfac 8334 ® (from Milliken) | 30.0 | 30.0 |
| Deionized Water | 1971.7 | — |
| Pigment Paste (from Example F) | 418.0 | 209.0 |
| Total | 4000.0 | 800.0 |

This example shows the use of ethoxylated syrenated phenol (i.e. Synfac 8334 ®) as a film build additive. (Note: it is not used as a pigment paste). This electrocoat bath was prepared by blending the above ingredients. The final bath non-volatile was 20.0%. The coating composition had a pH of 5.95 and a conductivity of 1820 microsiemens. Two zinc phosphate treated, cold-rolled steel panels were cathodically electrocoated at 83° F. for two minutes each. One was coated at 200 volts and the other at 250 volts. The wet films were cured at 360° F. for 17 minutes. The cured films had a thickness of 0.77 mils ($10^{-3}$ inches) and 0.98 mils, respectively. All films had very good smoothness.

EXAMPLE 2

Electrocoat Bath

|  | Weight | Solids |
|---|---|---|
| Emulsion (from Example G) | 1664.8 | 591.0 |
| Deionized Water | 1917.2 | — |
| Pigment Paste (from Example F) | 418.0 | 209.0 |
| Total | 4000.0 | 800.0 |

This electrocoat bath does not contain ethoxylated styrenated phenol as a film build additive. This electrocoat bath was prepared by blending the above ingredients. The final bath non-volatile was 20.0%. The coating composition had a pH of 6.15 and a conductivity of 1740 microsiemens. Two zinc phosphate treated, cold-rolled steel panels were cathodically electrocoated at 83° F. for two minutes each. One was coated at 200 volts and the other at 250 volts. The wet films were cured at 360° F. for 17 minutes. The cured films had a thickness of 0.64 mils and 0.80 mils, respectively. All films had good smoothness.

EXAMPLE 3

Electrocoat Bath

|  | Weight | Solids |
|---|---|---|
| Emulsion (from Example G) | 1631.0 | 579.0 |
| Deionized Water | 1867.0 | — |
| Pigment Paste (from Example D) | 402.0 | 201.0 |
| Total | 3900.0 | 780.0 |

This electrocoat bath contains ethoxylated styrenated phenol as a pigment dispersant (and not as a film build additive per se). This electrocoat bath was prepared by blending the above ingredients. The final bath non-volatile was 20.0%. The coating composition had a pH of 6.34 and a conductivity of 1983 microsiemens. The zinc phosphate treated, cold-rolled steel panels were cathodically electrocoated at 83° F.; 140 volts for two minutes. The wet films were cured at 360° F. for 17 minutes. The cured films had a thickness of 0.76 mils, and had very good smoothness.

EXAMPLE 4

Electrocoat Bath

|  | Weight | Solids |
|---|---|---|
| Emulsion (from Example H) | 847.9 | 301.0 |
| Synfac 8334 ® | 16.0 | 16.0 |
| Deionized Water | 1090.0 | — |
| Pigment Paste (from Example F) | 246.0 | 123.0 |
| Total | 2199.9 | 440.0 |

This electrocoat bath contains ethoxylated styrenated phenol as a film build additive (it does not contain it as a pigment dispersant). This electrocoat bath was prepared by blending the above ingredients. The final bath non-volatile was 20.0%. The coating composition had a pH of 6.8 and a conductivity of 1550 microsiemens. Two zinc phosphate treated, cold-rolled steel panels were cathodically electrocoated at 83° F. for two minutes each. One was coated at 175 volts and the other at 225 volts. The wet films, were cured at 360° F. for 17 minutes. The cured films had a thickness of 0.91 mils and 1.05 mils, respectively. Both films had very good smoothness.

EXAMPLE 5

Electrocoat Bath

|  | Weight | Solids |
|---|---|---|
| Emulsion (from Example H) | 921.0 | 327.0 |
| Deionized Water | 1053.0 | — |
| Pigment Paste (from Example D) | 226.0 | 113.0 |
| Total | 2200.0 | 440.0 |

This electrocoat bath contains ethoxylated styrenated phenol as a pigment paste (it does not contain it as a film build additive per se). This electrocoat bath was prepared by blending the above ingredients. The final bath non-volatile was 20.0%. The coating composition had a pH of 6.77 and a conductivity of 1755 microsiemens. The zinc phosphate pretreated, cold-rolled steel panels were cathodically electrocoated in a 83° F. bath at 200 volts for two minutes. The wet film was cured at 360° F. for 17 minutes. The cured film build was 0.99 mils. The film had very good smoothness.

We claim:

1. In an aqueous cathodic electrocoat bath composition comprising an epoxy/amine adduct, a blocked polyisocyanate crosslinker and a pigment paste comprising a pigment and a pigment dispersant, wherein the improvement comprises a pigment dispersant consisting essentially of an ethoxylated styrenated phenol having the formula:

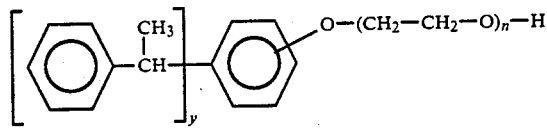

wherein
n denotes a number from 3-30, and
y denotes a number from 2-3.

2. The cathodic electrocoat bath composition of claim 1 wherein n is an average of 10, and y is an average of 2.2.

3. In an aqueous cathodic electrocoat bath composition comprising an epoxy/amine adduct, a blocked polyisocyanate crosslinker and an additive which increases film build and improves film smoothness, wherein the improvement comprises an additive consisting essentially of an ethoxylated styrenated phenol having the formula:

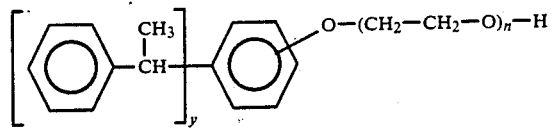

wherein
n denotes a number from 8-30, and
y denotes a number from 2-3.

4. The aqueous cathodic electrocoat bath composition of claim 3 wherein n is an average of 10, and y is an average of 2.2

5. In a method of coating a conductive substrate serving as a cathode comprising passing an electric current between said cathode and anode in electrical contact with an aqueous electrodepositable bath composition, wherein the aqueous electrodepositable bath composition comprises an epoxy/amine adduct, a blocked polyisocyanate crosslinker and a pigment paste comprising a pigment and a pigment dispersant, wherein the improvement comprises a pigment dispersant consisting essentially of an ethoxylated styrenated phenol having the formula:

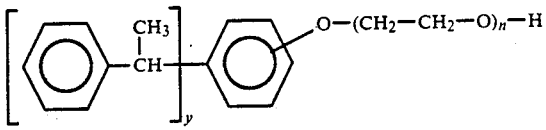

wherein
n denotes a number from 3-30, and
y denotes a number from 2-3.

6. In a method of coating a conductive substrate serving as a cathode comprising passing an electric current between said cathode and anode in electrical contact with an aqueous electrodepositable bath composition, wherein the aqueous electrodepositable bath composition comprises an epoxy/amine adduct, a blocked polyisocyanate crosslinker and an additive which increases film build and, wherein the improvement comprises an additive consisting essentially of an alkylated styrenated phenol having the formula:

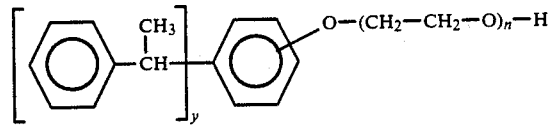

wherein
n denotes a number from 8-30, and
y denotes a number from 2-3.

* * * * *